(12) United States Patent
Kwapniewski et al.

(10) Patent No.: US 8,750,128 B2
(45) Date of Patent: Jun. 10, 2014

(54) DEMAND BASED DISTRIBUTION OF INTERNET PROTOCOL FORWARDING INFORMATION WITH A ROUTER

(75) Inventors: Richard Kwapniewski, Middletown, NJ (US); Thomas Bradley Scholl, Seattle, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 930 days.

(21) Appl. No.: 12/887,581

(22) Filed: Sep. 22, 2010

(65) Prior Publication Data

US 2011/0013518 A1  Jan. 20, 2011

Related U.S. Application Data

(63) Continuation of application No. 12/286,477, filed on Sep. 30, 2008, now Pat. No. 7,817,561.

(51) Int. Cl.
*H04L 12/28* (2006.01)
*H04L 12/56* (2006.01)
*H04J 1/16* (2006.01)

(52) U.S. Cl.
CPC .................. *H04L 45/00* (2013.01)
USPC .......... 370/238; 370/389; 370/412; 370/419

(58) Field of Classification Search
CPC ..................................... H04L 45/00
USPC .............. 370/238, 389, 412, 419
See application file for complete search history.

(56) References Cited

U.S. PATENT DOCUMENTS

2005/0120135 A1 *  6/2005  Molnar et al. ........... 709/242

* cited by examiner

*Primary Examiner* — John Pezzlo

(57) ABSTRACT

Systems and methods are described that reduce the amount of forwarding table state on components within routers. This is performed by having a router line card generate a prefix-request message to its central processor which contains a full routing table. Line cards only populate their forwarding tables for packets needed to transmit. By being only concerned with information of packets that are traversing each line card, the amount of required memory and processing required may be reduced for a complete forwarding table.

18 Claims, 15 Drawing Sheets

DEMAND BASED DISTRIBUTION OF INTERNET PROTOCOL FORWARDING INFORMATION WITH A ROUTER

CROSS REFERENCE TO RELATED APPLICATIONS

This application is a continuation of U.S. patent application Ser. No. 12/286,477, entitled "Demand-Based Distribution of Internet Protocol Forwarding Information within a Router," filed on Sep. 30, 2008 now U.S. Pat. No. 7,817,561, the disclosure of which is incorporated herein by reference in its entirety.

BACKGROUND OF THE INVENTION

The invention relates generally to network engineering. More specifically, the invention relates to router systems and methods that reduce the amount of forwarding table state on line cards within routers. Each line card forwarding table is based on the traffic demands only it needs to support, separate from the demands on other line cards. Line cards only populate their forwarding tables for packets needed to transmit.

Today, network operators or Internet Service Providers (ISPs) are forced to periodically upgrade Internet Protocol (IP) routing equipment to keep pace with their own internal growth as well as the rest of the Internet. Day by day, IP routing tables (global Border Gateway Protocol (BGP) routing tables) that comprise the Internet are constantly growing. This growth takes a toll on network equipment regarding memory to store routing tables and forwarding tables, and the processing power to create and maintain those tables.

Routers typically contain input ports, output ports, a specialized operating system, memory, and one or more processors. Distributed routers require memory for two purposes besides the operating system itself: storing a routing table which is used to perform routing decisions, and storing a forwarding table which is used when making forwarding decisions to switch packets out on particular interfaces.

These two functions are critical to the operation of any router employed on an IP network. Without sufficient memory, a router would be unable to properly forward packets. Due to Internet growth, network operators must upgrade their equipment to handle route growth and satisfy the above two purposes. This results in a cycle where equipment must be upgraded or replaced every 3 to 5 years. Furthermore, operators encounter scenarios where their hardware cannot be upgraded any further. This is due in part that when manufactured, there were technical limits prohibiting capacity expansion. For these cases, network operators have always been faced with replacing hardware.

Routers typically include a route processor and line cards. The route processor runs the operating system of the router, is responsible for communication to line cards, provides a means for the network operator to configure and monitor the router, runs the routing protocols (e.g. Open Shortest Path First (OSPF), Intermediate System to Intermediate System (IS-IS), Border Gateway Protocol (BGP) and others) required to communicate with other routers, makes routing decisions, and stores the network routing table. Line cards contain the input/output ports which are used to physically connect to other devices in the network, and in a router with distributed forwarding, also contain forwarding tables used to make a decision on how to switch a packet from input port to output port. The route processor communicates with the line cards through a protocol which is designed by the router manufacturer. This intra-router communication is typically unique to a particular router implementation.

In a distributed router, the route processor will typically use the intra-router communication protocol to transmit the entire list of prefixes in the routing table to each line card. In this manner, every line card possesses a "full view" of the routing information, so that every line card can switch any packet in the network. However, storing the entire list of prefixes places a large memory requirement on the line cards.

Some router implementations employ a cache-based forwarding table population scheme, where all line cards possess a forwarding table which is initially empty. One line card receives a packet on an input port for which the destination address is not contained in its forwarding table. The line card queries the route processor for routing information, and the route processor responds back to all line cards with the routing information. The line card which received the packet is able to use the routing information received to switch the packet to the proper output port. However, while the line card is waiting for the route processor to respond, the first packet received and any subsequent packet received for that same destination must be buffered or dropped.

Customer migrations are very complex and costly from the network provider point of view. Not only does additional hardware and capacity have to be ordered, but customers also must be notified of the inevitable service interruption. Lengthy migration strategies and tools must also be developed in order to move customers from one device to another. Additionally, to replace network hardware with state-of-the-art equipment includes major capital costs.

The challenge for network operators is to extend the operational life of their deployed networks and obviate the hardware upgrade/replacement cycle. In order to achieve this, a system and method is needed that allows a network operator to disassociate line card forwarding table growth from the ability of a router to maintain service.

SUMMARY OF THE INVENTION

The inventors have discovered that it would be desirable to have systems and methods that reduce the amount of forwarding table state on line cards within routers. Embodiments enable network operators to continue to provide services on end-of-life (EOL), end-of-sale (EOS) or end-of-support hardware.

Embodiments differ from other cache-based forwarding schemes in two ways: 1) It allows for each line card to possess a different forwarding table depending on the destination addresses of the packets that it must switch; and 2) It allows for packets to initially be switched to a helper router so that no packets must be buffered (reducing latency) or dropped (reducing packet loss) while the line card waits for a response from the route processor.

Embodiments enable a network operator to continue to operate on existing equipment with one or more line cards which have reached their limit to store forwarding information causing the router to be constrained. A network operator may also base their network design using predetermined devices implemented from the beginning of service as routers having line cards without the ability to store the full set of routes in their forwarding tables. Each line card forwarding table is based on the traffic demands it needs to support, separate from the demands on other line cards. This reduces the amount of forwarding state required to be stored on any individual line card. This eliminates concern that these devices would require upgrade or replacement in the future. It also may allow a network operator to purchase lower cost equipment with lower memory requirements.

Embodiments allow a network operator to reduce the amount of line card forwarding table state within routers. This is performed by having a constrained router initially forward a packet via a separate device called a helper router which contains a full routing/forwarding table until the router line card receives a response to a prefix-request to its route processor which contains a full routing table. Line cards only populate their forwarding tables for packets needed to transmit. By being only concerned with packet information that is traversing each line card, the amount of required memory and processing required may be reduced for a complete forwarding table.

One aspect of the invention provides a method for reducing the amount of forwarding table state on line cards within routers used in a network. Methods according to this aspect of the invention include implementing a helper router having a full route table for the network, initializing a router line card forwarding table as empty, upon receiving a packet at the line card, sending a prefix-request to the router's route processor, performing a route lookup at the processor based on the prefix-request, forwarding the received packet and subsequent packets addressed to the same host-specific destination from the line card to the helper router where a forwarding look-up is performed until a prefix-response prefix is received at the line card, receiving a prefix-response prefix at the line card, and installing the prefix-response prefix in the line card forwarding table for the packet destination.

Another aspect of the invention is where the prefix-request includes a source address corresponding to the line card, a host-specific destination address corresponding to the received packet, and a predetermined time a prefix-response prefix may be used.

Another aspect of the invention provides a data communications network. Data communications networks according to this aspect of the invention include a plurality of interconnected routers including a helper router having a full routing table, and a router having a line card forwarding table configured as empty, and a network configuration wherein the line card receives a packet and sends a prefix-request to the router's route processor where a look-up for that packet destination is performed and forwards the received packet to the helper router where a forwarding look-up is performed until a prefix-response prefix is received at the line card.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
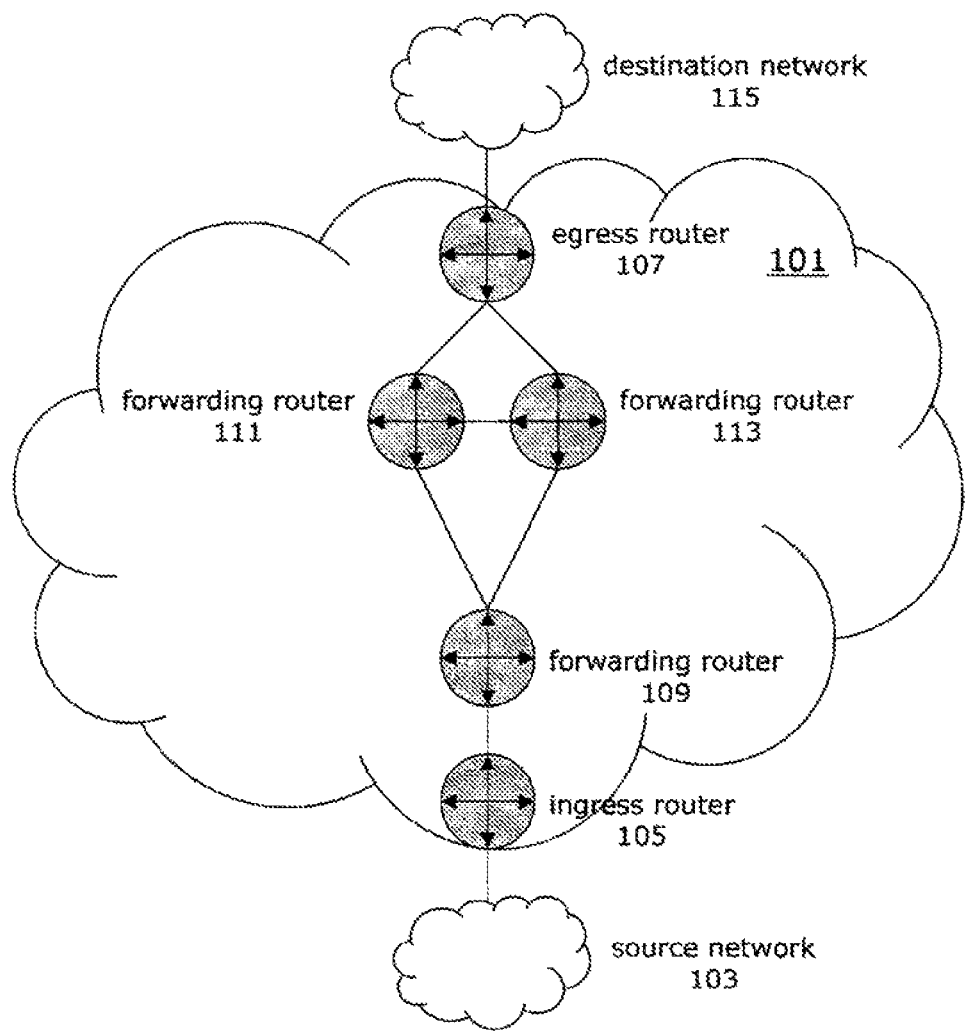
FIG. 1 is an exemplary network.

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions for configuring routers to have line cards with constrained memory and unable to store a full forwarding table. Embodiments initially forward received traffic to a helper router, and then learn a partial forwarding table based on the traffic demands only it needs to support, separate from the traffic demands on other line cards. One or more line cards learn their forwarding tables via a prefix-request to the router's route processor which contains a full routing table for the network. The route processor responds with a prefix-response. The invention may be enabled as a modular framework and/or deployed as software as an application program tangibly embodied on a program storage device. The application code for execution can reside on a plurality of different types of computer readable media known to those skilled in the art.

Each line card's forwarding table may be initialized as empty, and receive its forwarding table based on the demand of the packets it receives. Initial packets are forwarded to a helper router to eliminate dropped packets and minimize latency while awaiting the prefix-request/prefix-response cycle.

FIG. 1 shows a typical network 101 that is comprised of a plurality of routers, including a network ingress (Provider Edge (PE)) router 105, an egress (PE) router 107 and network forwarding (Provider (P)) routers 109, 111, 113 depending on the size of the network 101. P routers are strictly interior routers and do not terminate any external connections. Many P routers may be accessed between two PE routers. For example, traffic may enter a PE router in San Diego, Calif., and need to egress on a PE router in Boston, Mass., and traverse a route via a plurality of P routers from San Diego to Los Angeles to Chicago to New York to Boston. FIG. 1 also shows a source network 103 and a destination network 115 for which the network 101 provides connectivity.

A router is an electronic device and/or software that connect at least two networks, such as two Local Area Networks (LANs) or Wide Area Networks (WANs), and forwards packets between them. Each packet may traverse many routers, making many hops over a network as well as multiple routers within a large organization.

All routers perform two functions. First, a router must perform a forwarding decision on each arriving packet for deciding where to send it next. An IP router performs this by looking up the packet's destination address in a forwarding table. This yields the egress port through which the packet should be sent. This operation is called an address lookup. Second, the router must transfer the packet from the ingress port to the egress port identified by the address lookup operation. This is called switching and involves physical movement of the bits carried by the packet. The combination of lookup and switching operations makes per-packet processing in routers a time consuming task. As a result, routers have been designed to employ a pre-built forwarding table (also known as a Forwarding Information Base (FIB)) distributed to the router line cards to speed-up the lookup process. However, these forwarding tables require expensive memory for storage of this forwarding information, and so the size of the memory (and therefore the forwarding tables) is often limited.

Figure 2A:
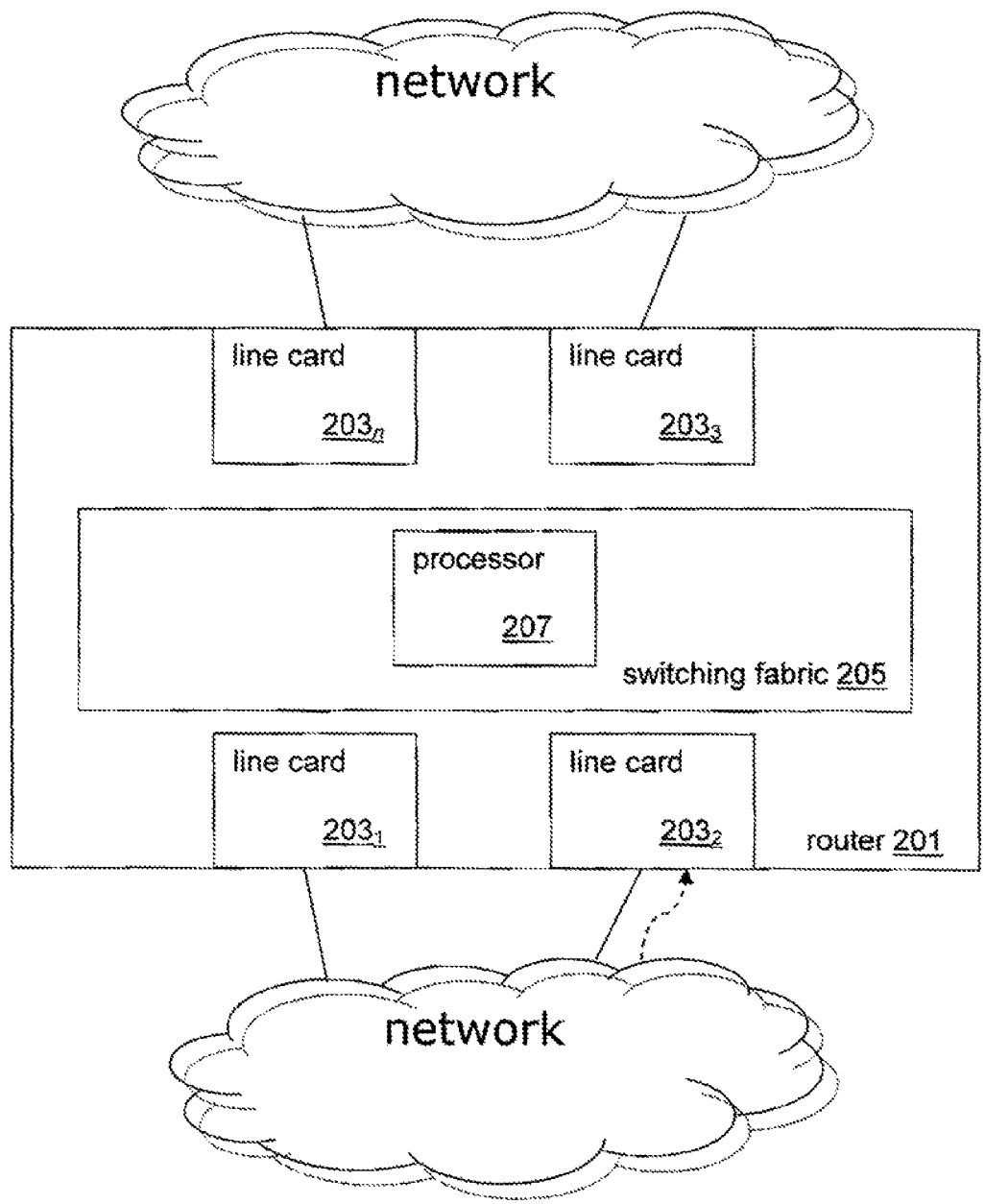
FIGS. 2A-2E is an exemplary router/line card architecture with prefix-request/prefix-response flow according to one embodiment.

FIG. 2A shows a block diagram of a typical high speed router 201 architecture. It comprises one or more line cards $203_1, 203_2, 203_3, \ldots, 203_n$ (collectively 203), each line card 203 having input and output packet processors and a switching fabric 205 (such as a crossbar) that interconnects all line cards 203. The router also contains a route processor 207 functioning as the central controller for the router 201. The router performs two main functions for each packet: 1) performing a lookup based on the packet's destination address to identify the outgoing port, and 2) switching the packet to an output port.

The processor 207 in a router 201 performs one or more routing protocols such as Routing Information Protocol (RIP), OSPF, IS-IS, BGP, and others, by exchanging protocol messages with neighboring routers. This enables it to maintain a routing table that contains a representation of the network topology state information and store the current information about the best known paths to destination networks. Routers 201 typically maintain a version of this routing table in all line cards so that lookups on incoming packets can be performed locally on each line card, without loading the processor 207. This version of the route processor's routing table is what is referred to as the line card's forwarding table because it is directly used for packet forwarding. There is another difference between the routing table in the processor 207 and the forwarding tables in the line cards 203. The processor's 207 routing table usually keeps much more information than the line cards' 203 forwarding tables. For example, a forwarding table may only keep the outgoing port number, address of a next hop, and some statistics with each route, whereas the processor's 207 routing table may keep additional information such as, time-out values, the actual paths associated with the route, etc.

A next hop is the next router to which a packet is sent from any given router as it traverses a network from its source to its destination. In the event that the packet is at the final router in its journey, the next hop is the final destination. A hop is the trip that a packet takes from one router to another or from the final router to the destination. A packet, also referred to as a datagram, is a fundamental unit of data transmission on the Internet and other Transmission Control Protocol/Internet Protocol (TCP/IP) networks.

Routers forward packets between networks using headers and forwarding tables to determine the best path to forward the packets. Routers work at the network layer of the TCP/IP model or layer 3 of the OSI model. Routers also provide interconnectivity between like and unlike media. This is accomplished by examining the header of a data packet, and making a decision on the next hop to which it should be sent. They use preconfigured static routes, status of their hardware interfaces, and routing protocols to select the best route between any two subnets.

The next hop for any particular packet at any particular point in its journey is determined, for example, in the Internet by both the IP address of its destination as contained in its header and the routing table in the router at that point. An IP address is a unique numeric identifier for each computer or router on a TCP/IP network. The routing table in a router is a database that stores and frequently updates the IP addresses of reachable networks, called "routes" or "prefixes," and the most efficient path to them.

Embodiments allow for a network comprising routers with limited or constrained line card forwarding table memory which initially does not possess necessary routing information to properly forward a received packet and transmit packet(s) to a helper router which contains a full routing/forwarding table. A line card transmits a prefix-request to its route processor which contains a full routing table of a particular IP network such as the Internet or a Virtual Private Network (VPN). The line card receives a prefix-response from the processor which allows the constrained line card to learn the forwarding information to properly forward subsequently received packets having the same destination. Embodiments allow for a complete network configuration, and for configuring each network router separately, albeit with greater network operator involvement.

The generated prefix-request informs the processor 207 having a full route table to respond with the forwarding information with the longest-match prefix (route) back to the requesting line card. The forwarding information specifies how to reach a certain network, i.e., which egress router to use. For example, a destination Uniform Resource Locator (URL) may map to IP address 10.1.2.3, and 10.1.2.3 might be reached by route advertisement 10.1.2.0/24. In this case, 10.1.2.0/24 is shorthand for specifying any route starting with 10.1.2. with any number in the last position of the IP address.

The processor 207 responds with a request-response to the line card 203 containing forwarding information for the most efficient/optimal path. The format of the request-response may vary based on the particular router implementation. Embodiments operate with traffic forwarding through constrained line cards at the same time via the helper router.

Figure 3:
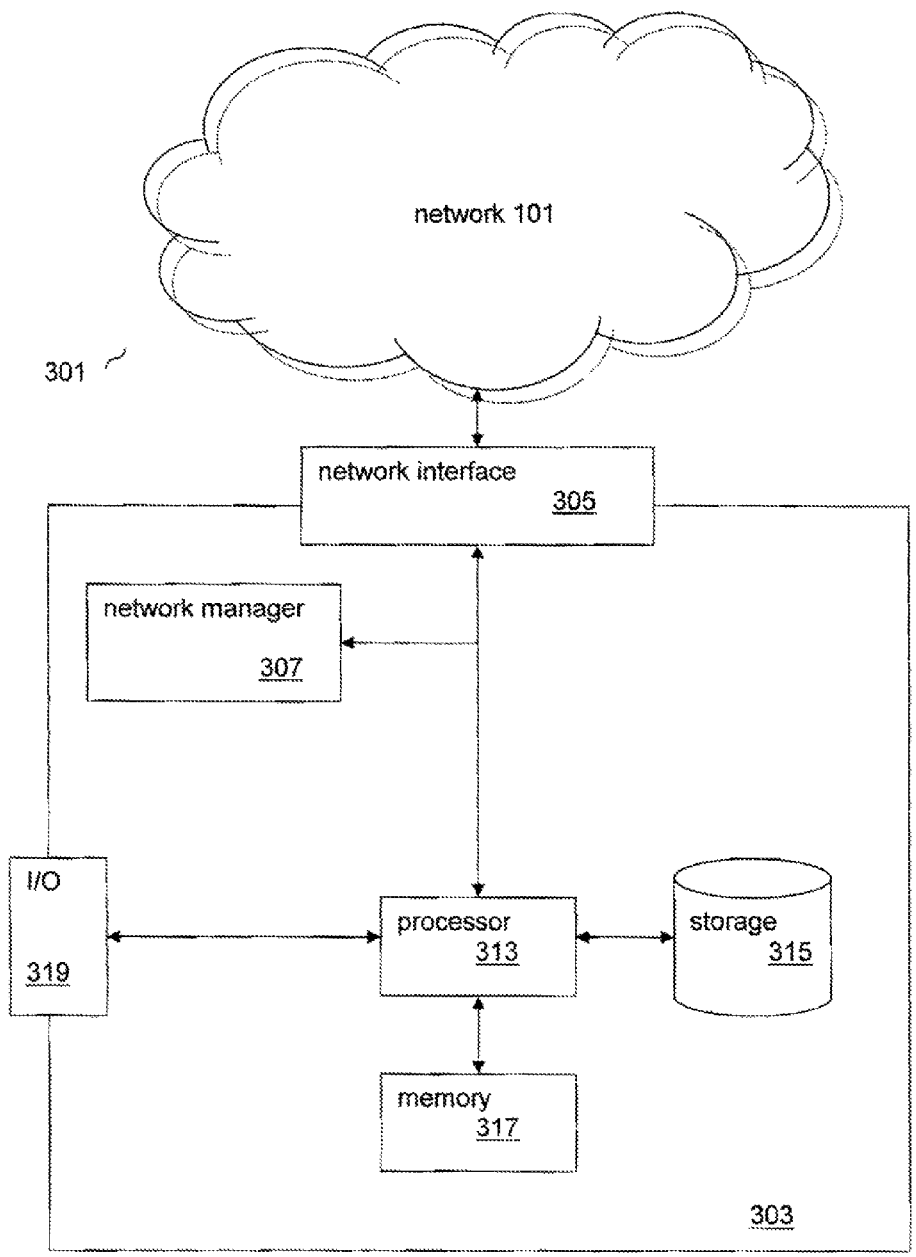
FIG. 3 is an exemplary system framework.
Figure 4:
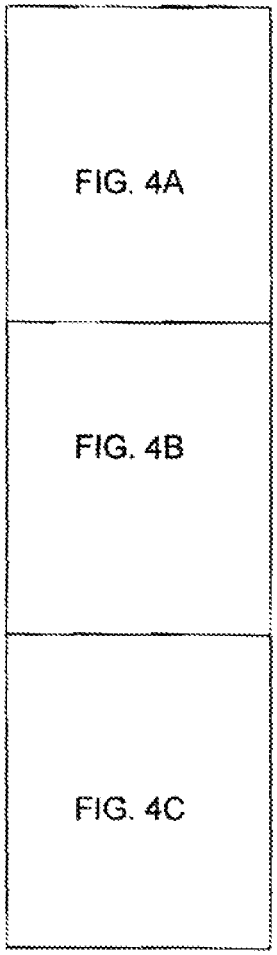
FIG. 4 is an exemplary method.
Figure 4A:
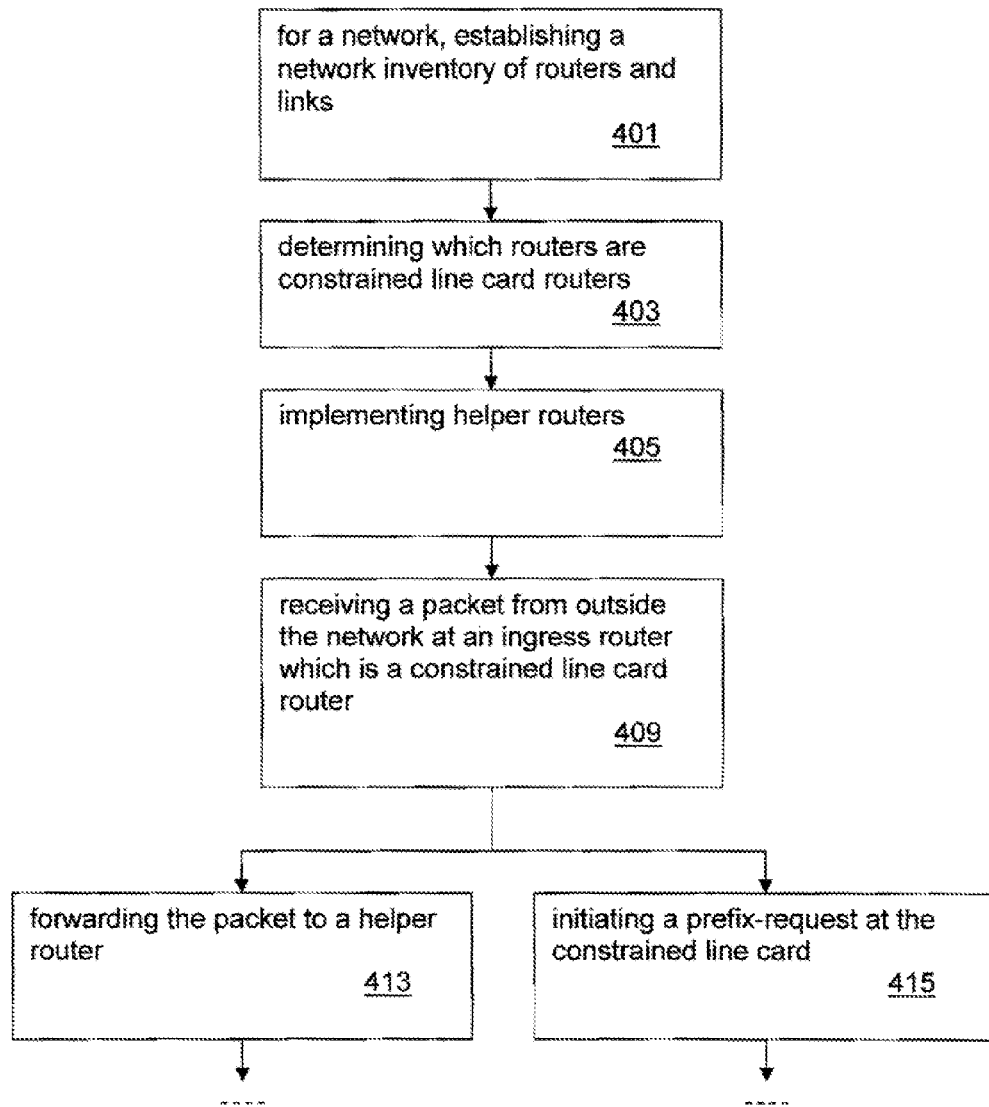
Figure 4B:
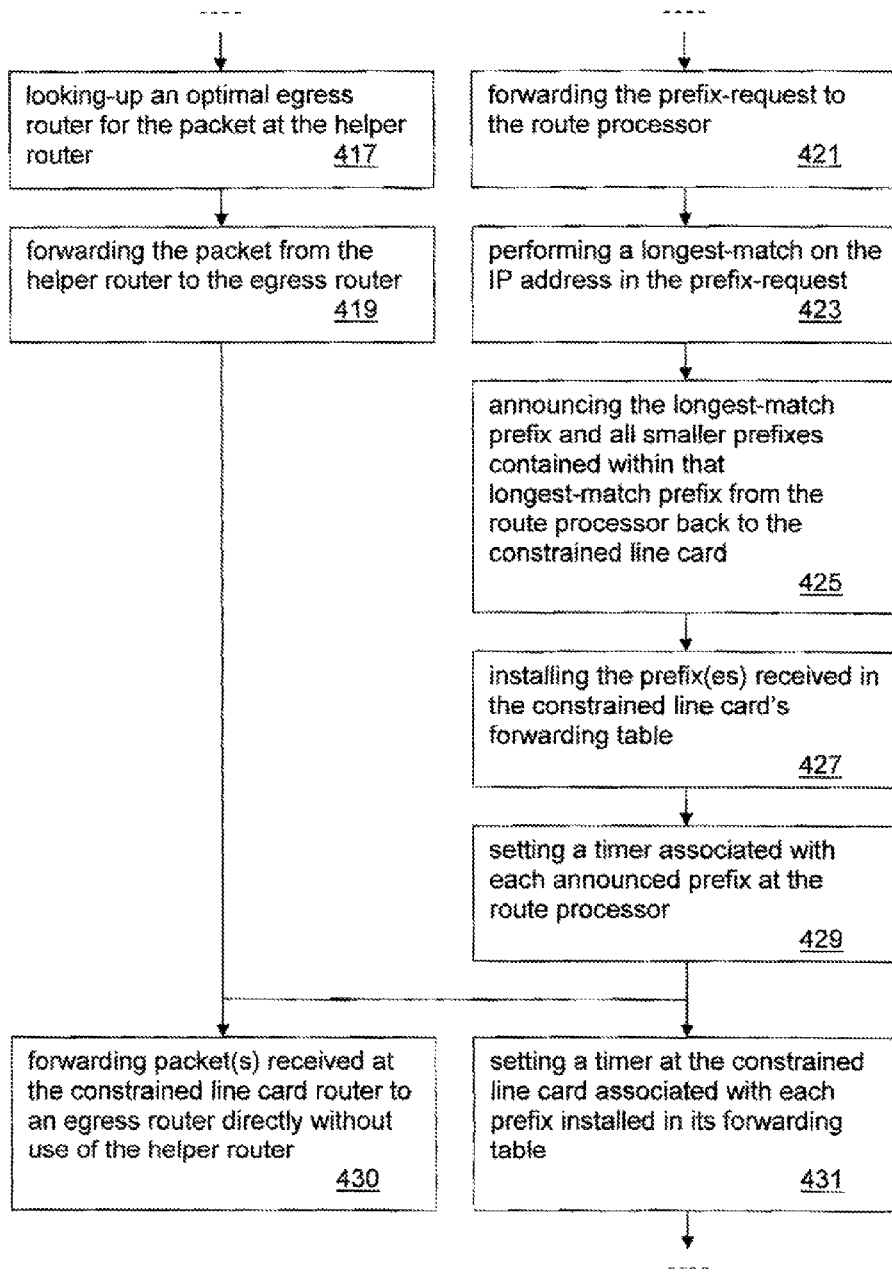
Figure 4C:
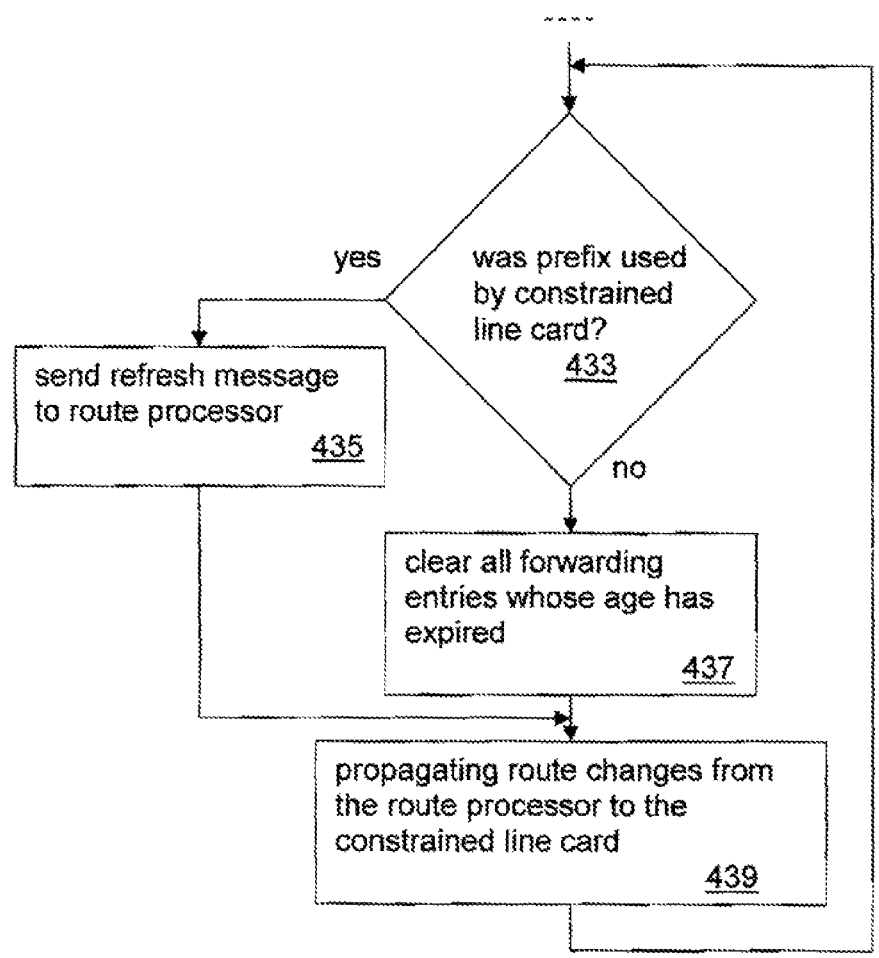

FIG. 3 shows an embodiment of a system 301 framework 303 and FIG. 4 shows a method. The framework 303 which may be part of a network management server includes a network interface 305 coupled to a network and configured to acquire network topology information, network reachability information, as well as network status information to perform network management services. The network interface 305 is coupled to a network manager/inventory database 307, and a processor 313. The processor 313 is coupled to storage 315, memory 317 and I/O 319.

The framework 303 stores acquired network data into a data store 315. The framework 303 may be implemented as a computer including a processor 313, memory 317, storage devices 315, software and other components. The processor 313 is coupled to the network interface 305, I/O 319, storage 315 and memory 317 and controls the overall operation of the computer by executing instructions defining the configuration. The instructions may be stored in the storage device 315, for example, a magnetic disk, and loaded into the memory 317 when executing the configuration. The invention may be implemented as an application defined by the computer program instructions stored in the memory 317 and/or storage 315 and controlled by the processor 313 executing the computer program instructions. The computer also includes at least one network interface 305 coupled to and communicating with a network such as shown in FIG. 1 to interrogate and receive network configuration or alarm data. The I/O 319 allows for user interaction with the computer via peripheral devices such as a display, a keyboard, a pointing device, and others.

Figure 5A:
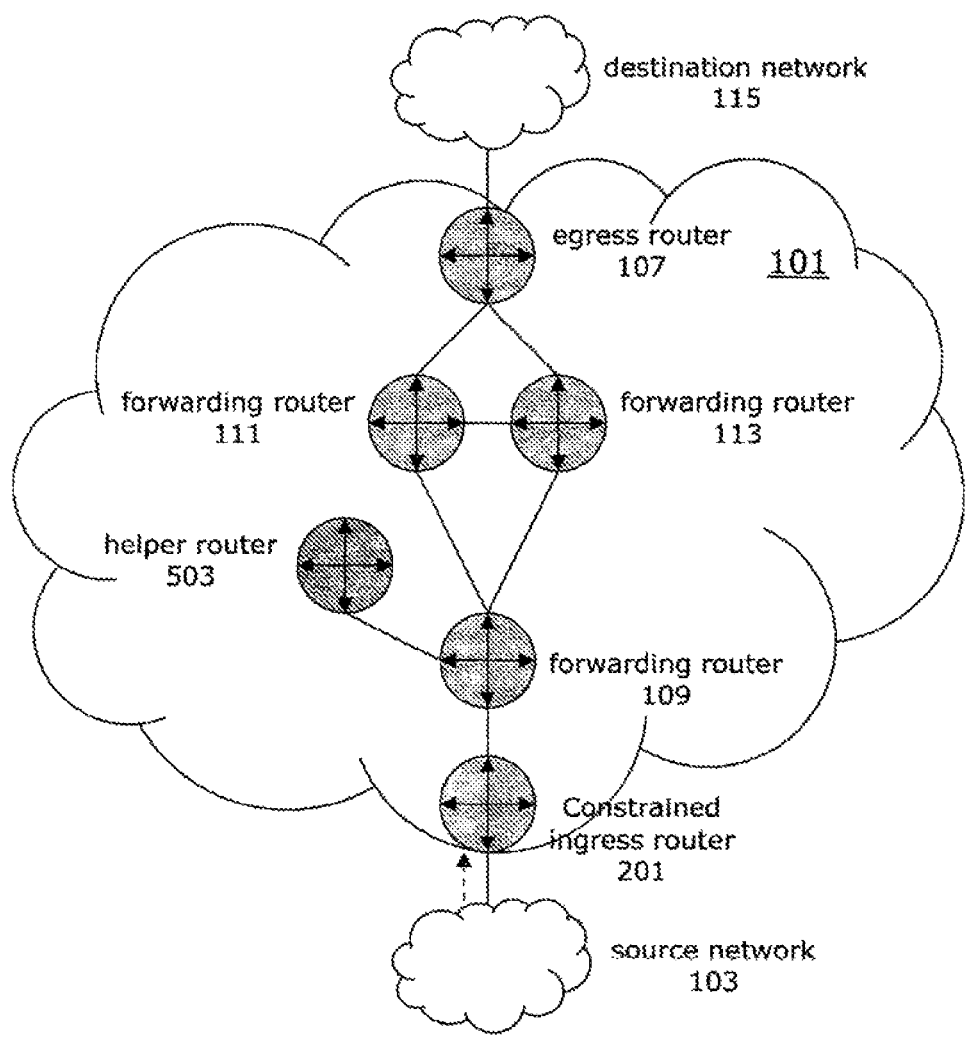
FIGS. 5A-5D is an exemplary network configuration with traffic flow according to one embodiment.

FIG. 5A shows an exemplary network 101 embodiment result including at least one router 201 having at least one constrained line card $203_2$ and at least one helper router 503. A constrained line card $203_2$ is one having a limited, or empty, forwarding table. For this embodiment, each router may be preconfigured by the network operator. Alternatively, each network 101 routers' memory may be periodically examined for capacity to predict future constrained router candidates, either manually or using the system framework 303.

A helper router 503 is a conventional router having a memory with sufficient capacity for the network in which it is deployed and may be a conventional router sourced from Cisco or Juniper. The functionality of a helper router 503 is that of a detour. In a prior art network, traffic traverses the shortest path between a PE (ingress) router to a PE (egress) router over one or more P routers. However, if a router does not know how to route the traffic to the egress router, it forwards the traffic to the helper router 503 which contains a full routing table. Embodiments exploit the functionality of how the helper router 503 is used within a network 101.

In a defined network 101, an inventory is performed of all PE and P routers and links (step 401). The method determines using set thresholds, or prediction, which routers' line cards are constrained candidates $203_2$ based upon line card 203 forwarding table memory and network 101 routing table size (step 403). After the constrained line cards 203 are identified, the number of helper routers must be determined. The helper routers may be selected from the remaining pool of PE and P routers having sufficient memory, or may be additional routers. Each router 201, known as a constrained router, containing a constrained line card $203_2$, and helper router 503 is configured to support the methodology.

The number of helper routers 503 may be determined based on three factors: latency requirements, capacity requirements, and redundancy requirements (step 405). When a constrained router forwards packets via the helper router, the packets are traversing a non-optimal path through the network, i.e. a detour. Sufficient helper routers must be implemented to maintain the network operator's latency requirements. For example, one embodiment may implement one helper router in each city. Regarding capacity, the helper routers must be sized to meet the expected concurrent traffic load from all constrained routers. For example, $$\sum_i \text{Capacity Helper Router}(i) \geq \sum_j \text{Load Constrained Router}(j), \quad (1)$$

where i is the number of helper routers and j is the number of constrained routers. Lastly, additional helper routers 503 may need to be implemented if redundancy is required, e.g. if 1:1 redundancy is required to protect against failure of any single helper router, twice the number of helper routers will be required than otherwise.

The route processor 207 sets a forwarding information download policy toward each line card 203 which controls which routes get populated in the forwarding table of each line card 203. For a constrained line card $203_2$, the route processor 207 will initially block all routes from being sent except a default route.

A datagram/packet is received from outside the network 101 at a PE router 105 or inside the network 101 at a P router 111 which can include a constrained line card $203_2$ (step 409). The constrained line card $203_2$ receives the packet destined for a network outside of the network 101 (FIGS. 2A, 5A, traffic flow is shown as a broken line). Because the line card is constrained, it does not have the route in its forwarding table.

The routing/forwarding tables on the constrained router 201 will contain a default route learned from the helper router. This default route may be the well-known IP address of 0.0.0.0/0 or some other IP addressed configured by the operator to be designated as a default route. The route processor will populate the default route in each constrained linecard.

Figure 5B:
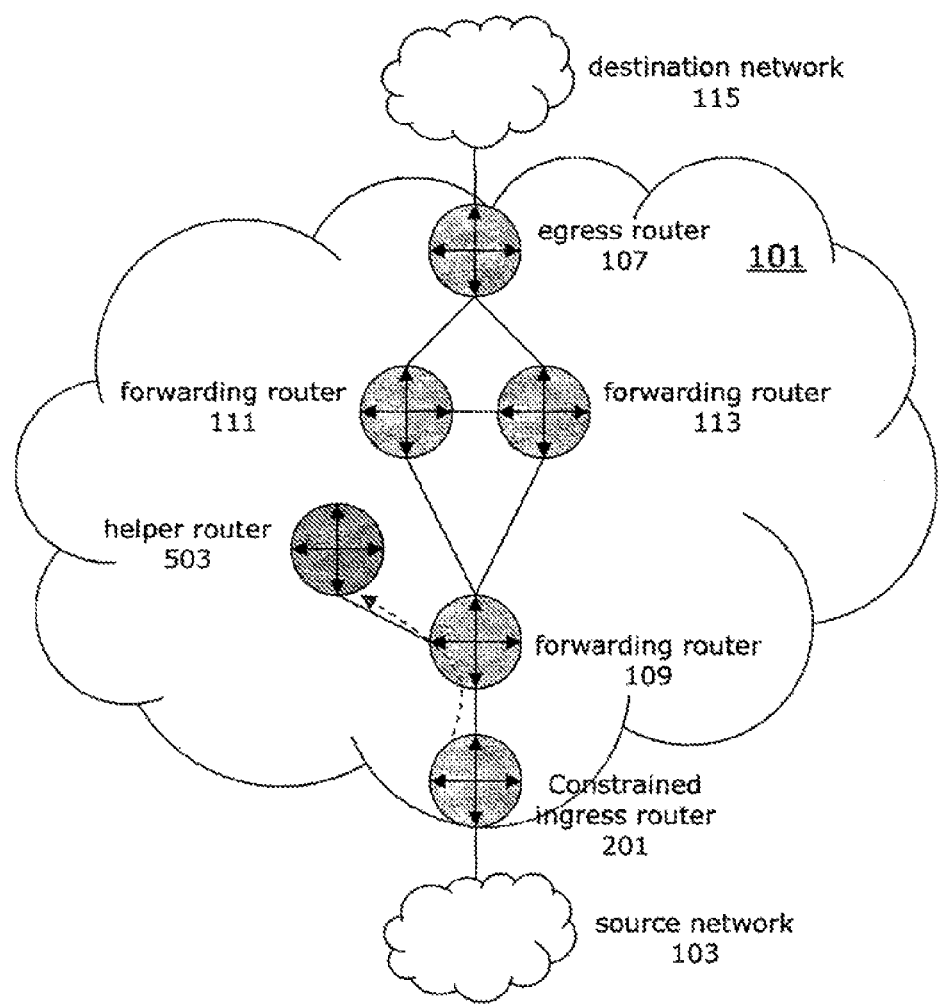
Figure 5C:
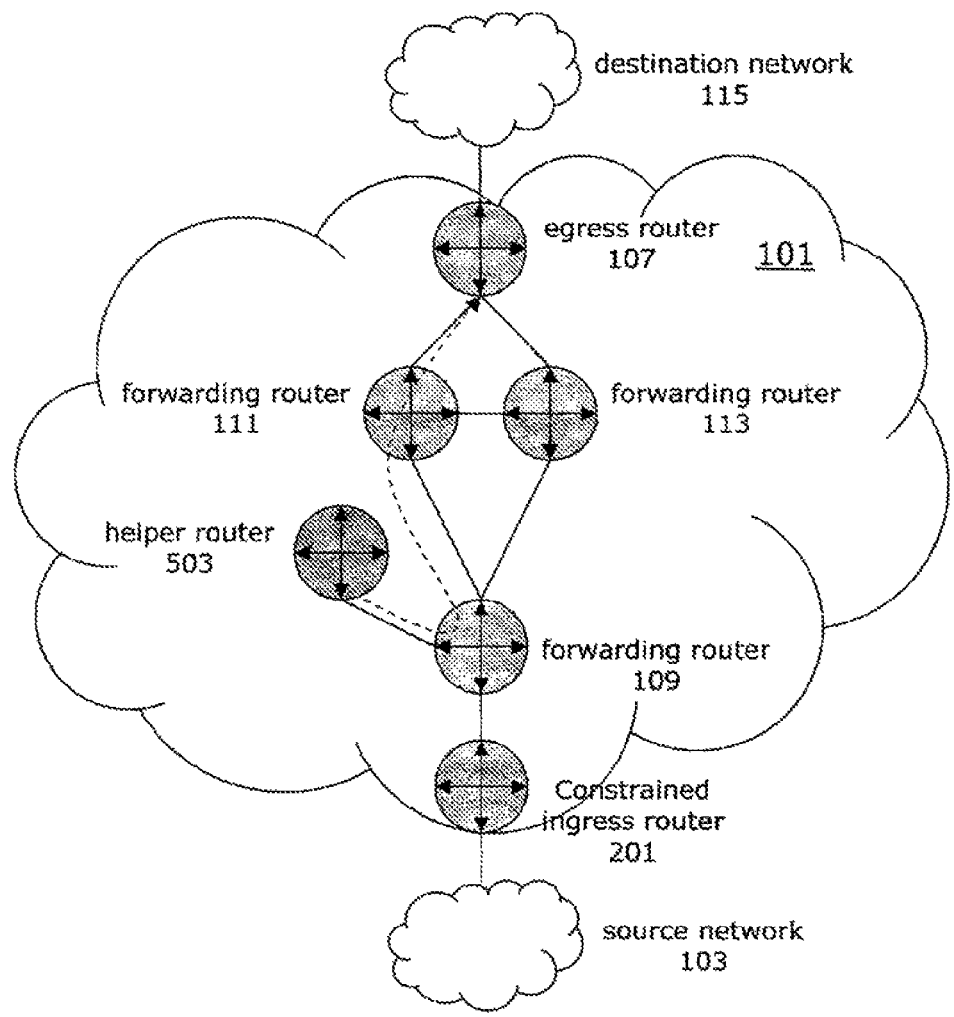
Figure 5D:
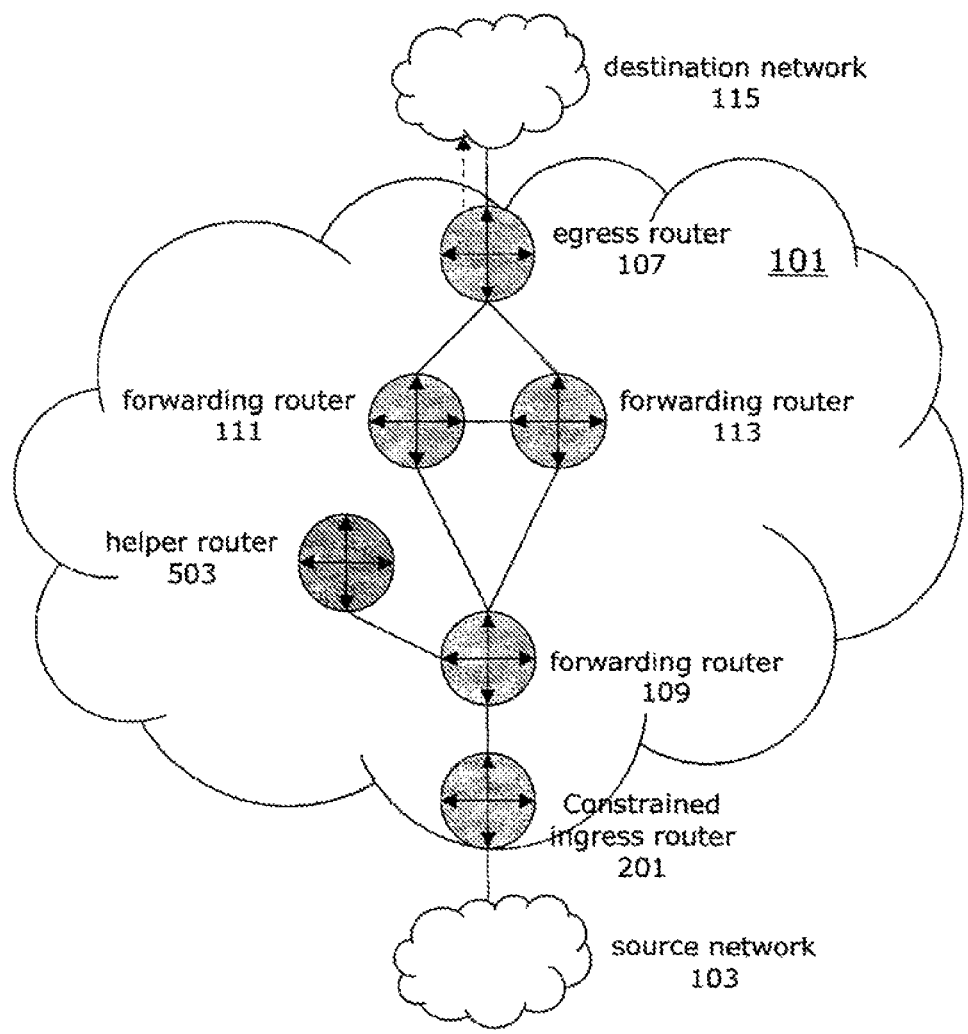

While the forwarding table on the constrained line card $203_2$ does not contain the route to a particular destination, the default route will be used, and therefore the constrained router 201 will forward the packets for that destination to a helper router 503 where a forwarding look-up is performed (steps 413, 417). The helper router 503 identifies the most optimal network PE (egress) router 107 (FIG. 5B) and forwards the packet to that egress router (step 419) (FIGS. 5C, 5D).

In order to obtain the most optimal route for the packet to its destination router, the constrained line card $203_2$ generates a prefix-request (step 415). The constrained line card $203_2$ triggers the prefix-request when a packet is forced to use the default route. The prefix-request is formatted to use the intra-router communication protocol that has been implemented on that particular manufacturer's router to communicate between line cards and the processor 207 (step 421). The constrained line card $203_2$ should keep track of outstanding prefix-request messages sent to the route processor 207, and should avoid sending multiple prefix-requests for the same destination until allowing for sufficient time, configurable by a network operator, for the route processor 207 to respond.

The prefix-request is sent from a line card 203 to a processor containing a source line card address, a destination IP address set to the address in the first packet transmitted to the helper router and an age, or timer value that the line card 203 is allowed to use the requested prefix. The destination address is a specific address of the destination host. For example, a 32-bit address for IPv4 or 128-bit address for IPv6.

Figure 2B:
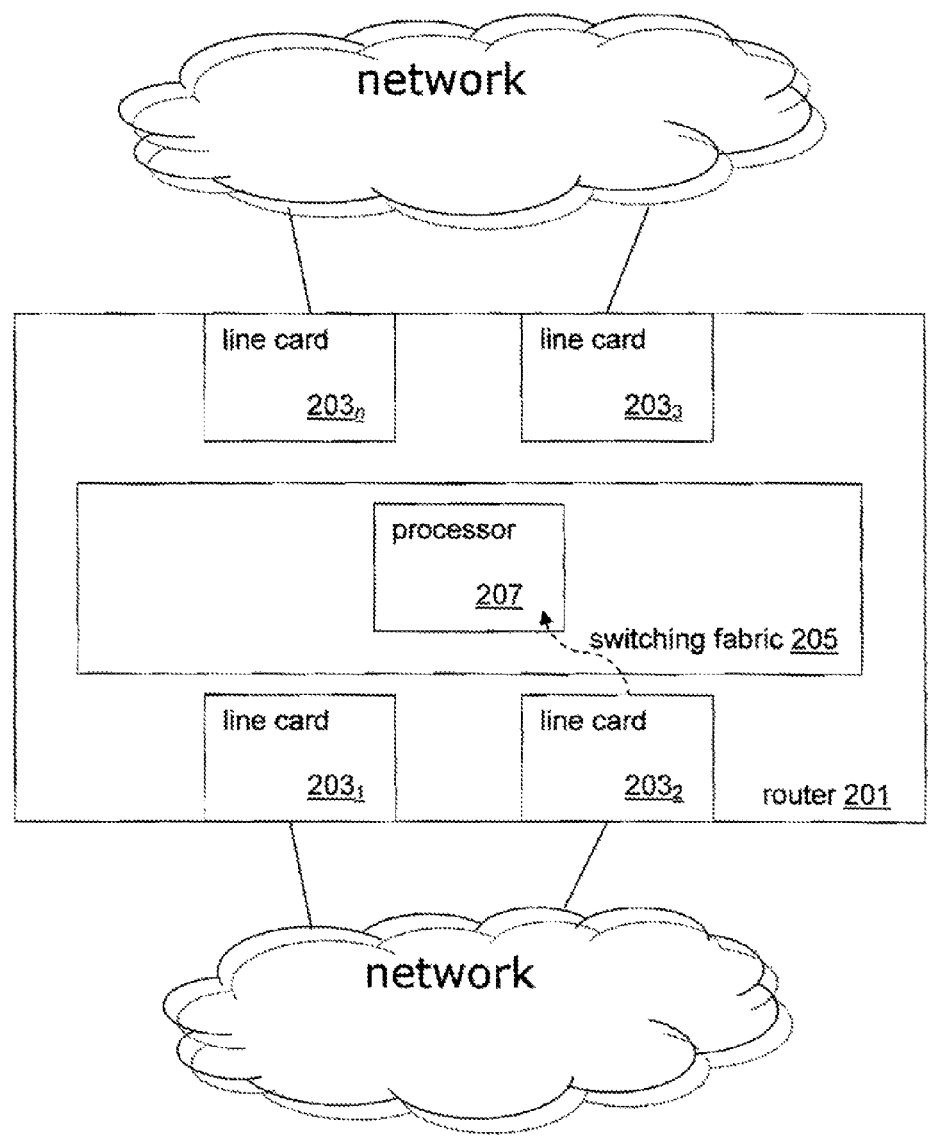

The processor 207 receives the prefix-request (FIG. 2B). The processor 207 performs a longest match operation on the IP address in the destination address field (step 423). The processor 207 matches the IP address in the destination address field with an existing BGP prefix from its routing table. The processor 207 also matches all prefixes which are more-specific sub-prefixes of the longest match prefix. If there is no match, the destination is unknown and the processor 207 ignores the prefix-request.

Figure 2C:
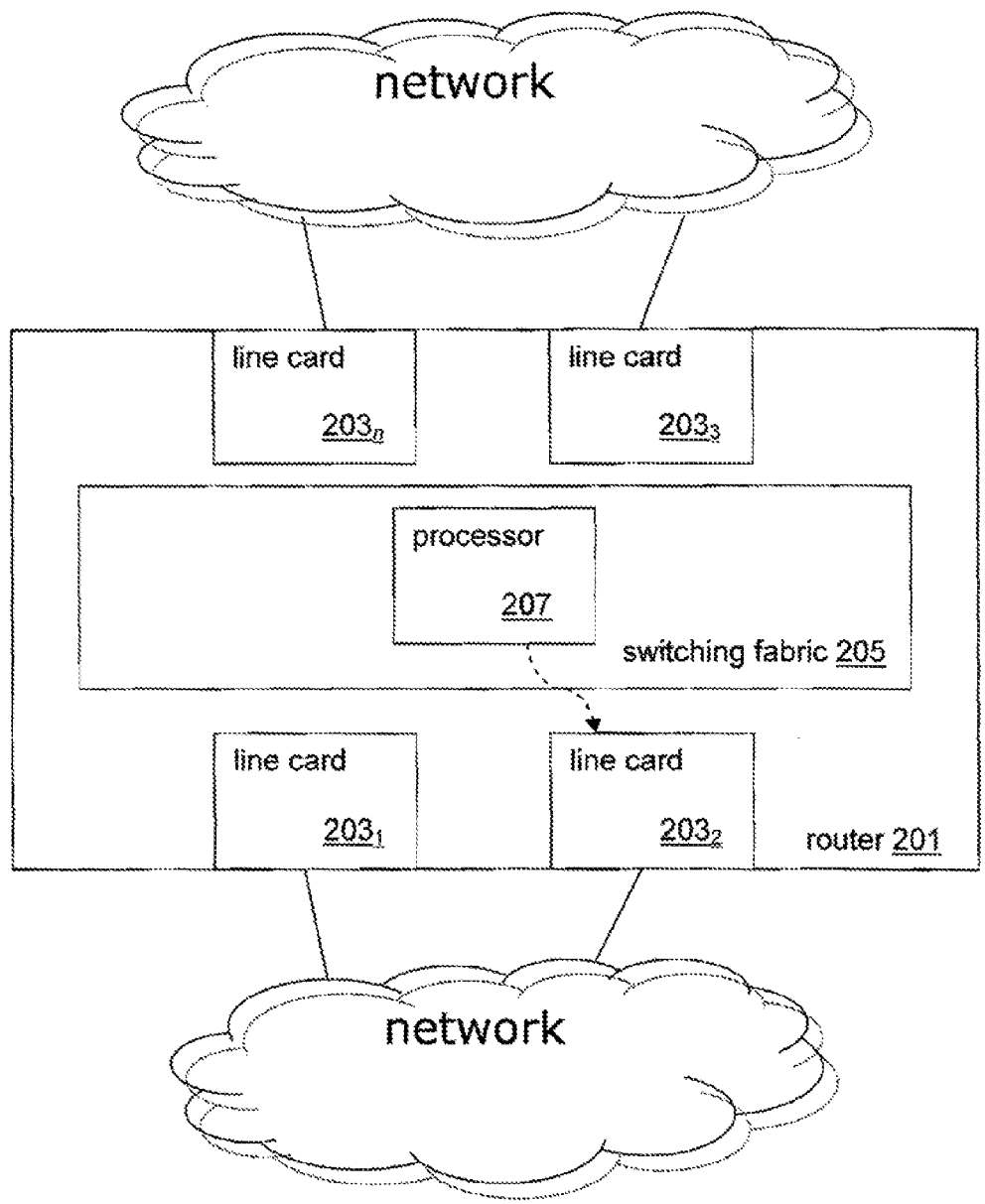
Figure 2D:
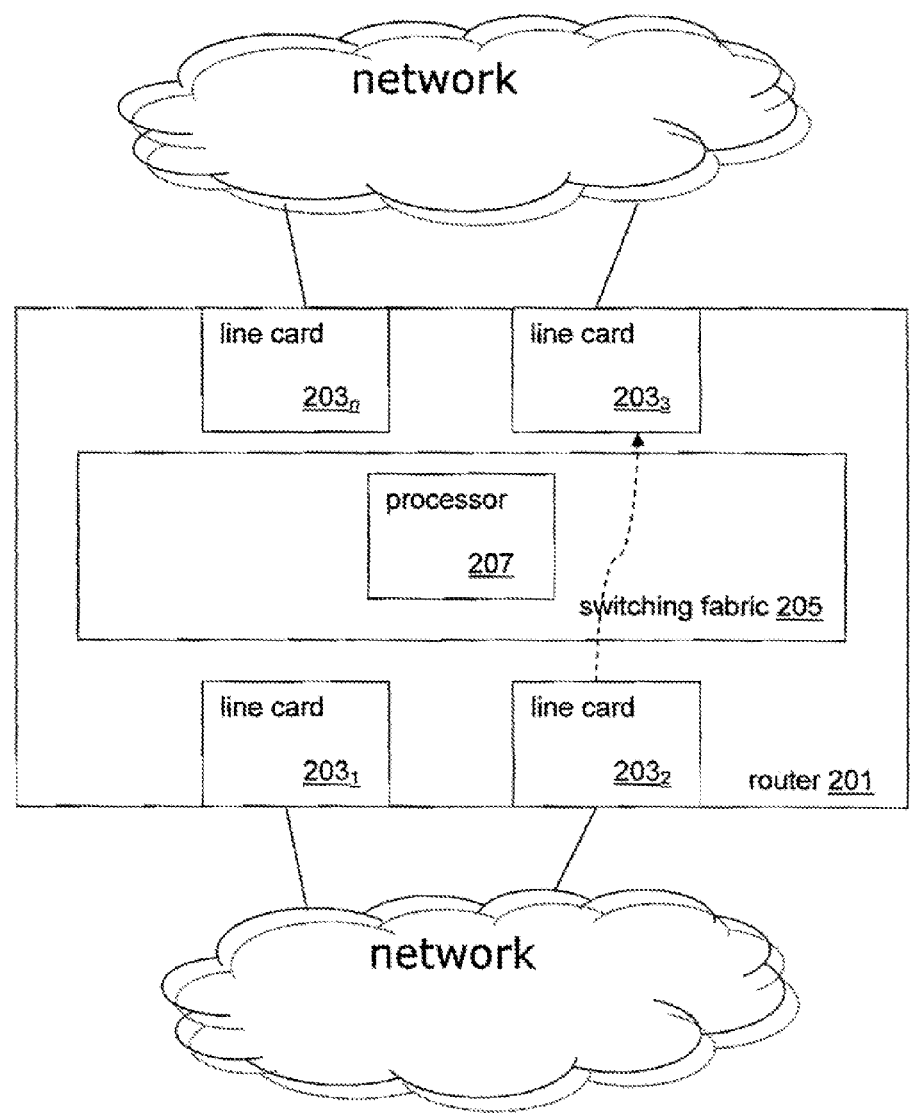
Figure 2E:
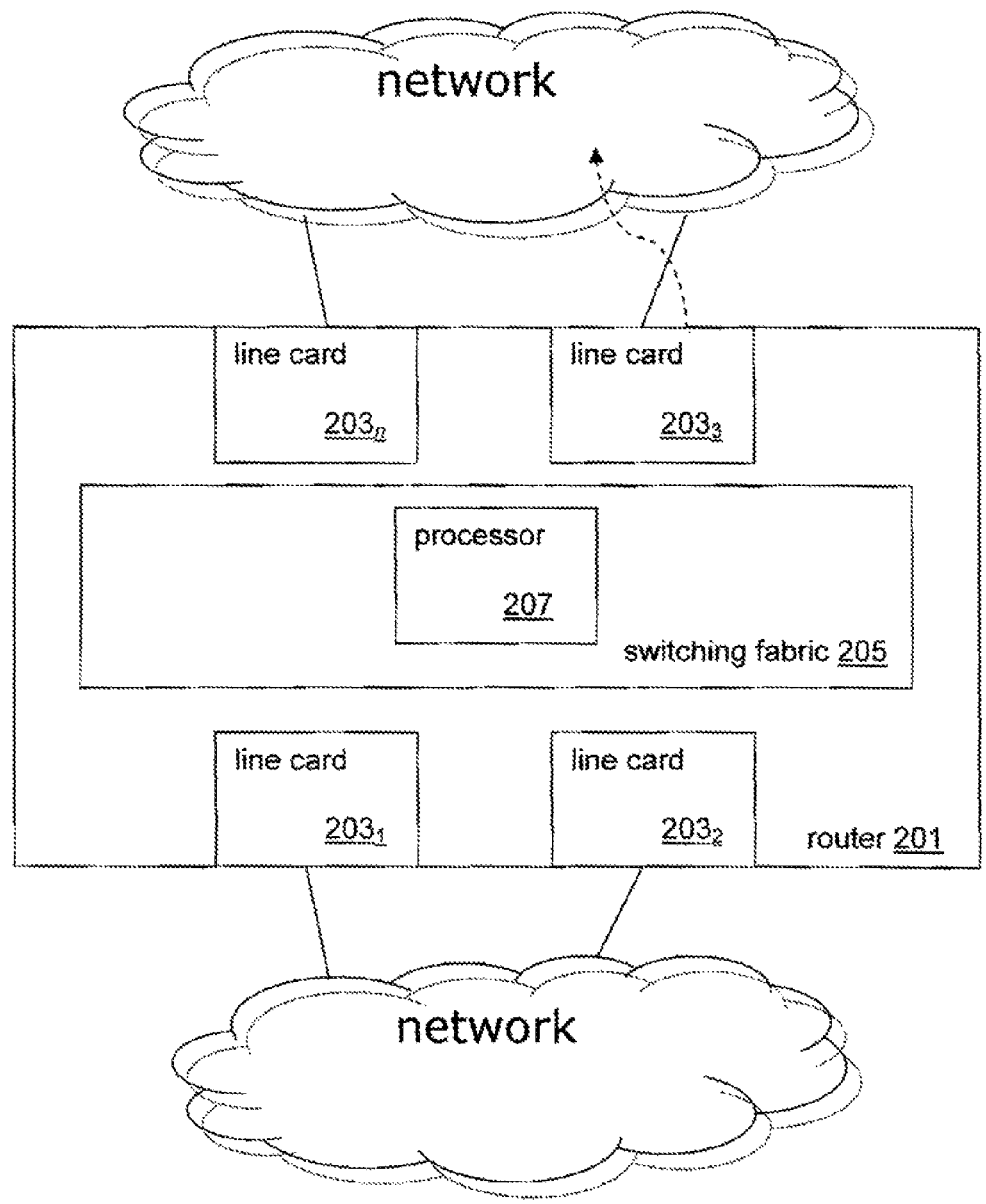

The processor 207 modifies its forwarding information download policy to the source line card $203_2$ to permit the longest-match prefix, and any more-specific prefix of that longest match, to be sent to the line card $203_2$. This policy change triggers the processor 207 to forward the routing information for the longest-match and any more-specific prefixes to the constrained line card $203_2$ via the intra-router communication as a prefix-response (FIG. 2C) (step 425).

The forwarding information download policy in the processor 207 also allows longer matches, i.e., if the processor learns of a more specific BGP prefix which matches the original prefix-request, that more specific prefix must also be propagated to the constrained line card. This results in some cases of a gratuitous announcement being sent, i.e., more than one prefix-response (forwarding table update) sent from a single prefix-request.

The constrained line card $203_2$ receives the prefix-response (forwarding information) from the processor 207 and installs the prefix into its forwarding table (step 429). The addition of the prefix into these tables causes the router to stop using the default route to send packets via the helper router. This prefix contains the forwarding information required to send to the exact router to which it should transmit packets to egress the network, providing a short-cut, avoiding the need to continue to transmit those packets via the helper router 203 (FIGS. 2A, 2D, 2E, 5E) (step 430).

To promote efficient use of resources for the processor 207 and line card $203_2$, an age timer is associated with every prefix-request sent and prefix-response received (steps 427, 431). The processor 207 will set the age of the updated forwarding information download policy based on the age requested in the original prefix-request. Unless the request is refreshed, after the timer expires, the processor 207 will modify its forwarding information download policy to the line card $203_2$ to no longer allow the prefix(es) originally requested.

This results in prefix withdrawal messages to be sent by the processor 207 to the line card $203_2$ related to the expired prefixes. This de-populates those prefixes from the forwarding table on the line card $203_2$.

The constrained line card $203_2$ also sets an age on the prefix-response received from the processor 207. This is the same age requested in its prefix-request. There are two separate timers maintained, one at the line card $203_2$ when the route announcement is sent and one at the processor 207 when it is received. Both timers are set to the (same) value as requested in the prefix-request. The timers exist in both places to protect against loss of communication between the processor 207 and the constrained line card $203_2$. If the timer was only at the processor 207, but the processor 207 lost communication to the constrained line card $203_2$, the constrained line card $203_2$ would hold on to the prefix forever. This is the same age requested in its prefix-request.

The constrained line card $203_2$ keeps an accounting of whether it forwards packets using a learned prefix (step 433) by setting a flag, which is initialized to "false," to now be "true" on the prefix to indicate it was used at least once. If the constrained line card $203_2$ needs to use the learned prefix, the constrained line card $203_2$ must send a refresh message to the processor 207 before the age timer expires (step 435). The refresh is formatted the same as the original prefix-request, but rather than containing the original host-specific destination address, it contains the prefix learned from the processor 207. Following a refresh, the only action taken by the constrained line card $203_2$ and processor 207 is to reset the age, i.e., the export policy change and BGP update message does not need to be performed again. Each time the age gets reset, the flag indicating the prefix was used must also be reset to "false."

If a refresh is not requested, the constrained line card $203_2$ and processor 207 clear all routing entries which have reached their age limit (step 437). If the constrained line card $203_2$ still needs to transit packets to the same destination prefix again, it will restart the method. If the processor 207 learns about a route change, the processor 207 must propagate that change to all of the constrained line cards 203 to which the route was sent.

If the processor 207 learns about a change related to any of the prefixes it has announced to the constrained line card $203_2$, e.g. a route withdrawal, a change in next-hop IP address, the processor 207 must propagate that change to the constrained line card $203_2$ to which the prefix was sent (step 439).

One or more embodiments of the present invention have been described. Nevertheless, it will be understood that various modifications may be made without departing from the spirit and scope of the invention. Accordingly, other embodiments are within the scope of the following claims.

What is claimed is:

1. A method for reducing the amount of forwarding table state on line cards within routers used in a network comprising:
    implementing a helper router having a full route table for the network;
    initializing a router line card forwarding table as empty;
    upon receiving a packet at the line card, sending a prefix-request to the router's route processor;
    performing a route lookup at the processor based on the prefix-request;
    forwarding the received packet and subsequent packets addressed to the same host-specific destination from the line card to the helper router where a forwarding look-up is performed until a prefix-response prefix is received at the line card;
    receiving a prefix-response prefix at the line card; and
    installing the prefix-response prefix in the line card forwarding table for the packet destination.

2. The method according to claim 1 wherein the prefix-request comprises:
    a source address corresponding to the line card;
    a host-specific destination address corresponding to the received packet; and
    a predetermined time a prefix-response prefix may be used.

3. The method according to claim 2 further comprising:
    initiating a line card timer set at the predetermined time when the prefix-response prefix is received; and
    initiating a processor timer set at the predetermined time when the prefix-response prefix is sent.

4. The method according to claim 3 further comprising:
    initializing a flag for the prefix-response prefix when received at the line card as false; and
    indicating whether the line card forwards received packets using the received prefix-response prefix by setting the flag to true.

5. The method according to claim 4 further comprising if the line card uses the prefix-response prefix, sending a refresh message from the line card to the processor.

6. The method according to claim 5 wherein the refresh message comprises:
    a source address corresponding to the line card;
    a prefix learned from the processor corresponding to the received packet; and
    the predetermined time.

7. The method according to claim 6 further comprising:
    if a refresh message is not received at the processor for the prefix-response prefix before the processor timer times out, sending a prefix withdrawal message to the line card for the expired prefix-response prefix; and
    depopulating the prefix-response prefix from the line card forwarding table.

8. The method according to claim 7 further comprising:
resetting the processor timer for the prefix-response prefix upon receipt of a refresh message at the processor; and
setting the line card timer upon receipt of a prefix-response prefix at the line card.

9. The method according to claim 8 further comprising if the processor learns of a change related to a prefix it sent to the line card in response to a prefix-request, sending the prefix change from the processor to the line card as a prefix-response prefix.

10. A data communications network comprising:
a plurality of interconnected routers comprising:
a helper router having a full routing table; and
a router having a line card forwarding table configured as empty; and
a network configuration wherein the line card receives a packet and sends a prefix-request to the router's route processor where a look-up for that packet destination is performed and forwards the received packet to the helper router where a forwarding look-up is performed until a prefix-response prefix is received at the line card.

11. The data communications network according to claim 10 wherein the prefix-request comprises:
a source address corresponding to the line card;
a host-specific destination address corresponding to the received packet; and
a predetermined time a prefix-response prefix may be used.

12. The data communications network according to claim 11 wherein the network configuration further comprises:
a line card timer set at the predetermined time and initiated when the prefix-response prefix is received; and
a processor timer set at the predetermined time and initiated when the prefix-response prefix is sent.

13. The data communications network according to claim 12 wherein the network configuration further comprises a flag for the prefix-response prefix set as false when the prefix-response prefix is not used to forward received packets and set as true when the prefix-response prefix is used to forward received packets.

14. The data communications network according to claim 13 wherein the network configuration further comprises a refresh message that is sent from the line card to the processor if the line card uses the prefix-response prefix.

15. The data communications network according to claim 14 wherein the refresh message comprises:
a source address corresponding to the line card;
a prefix learned from the processor corresponding to the received packet; and
the predetermined time.

16. The data communications network according to claim 15 wherein the network configuration further comprises a prefix withdrawal message that is sent from the processor to the line card if a refresh message is not received at the processor for the prefix-response prefix before the processor timer times out, the withdrawal message depopulates the expired prefix-response prefix from the line card forwarding table.

17. The data communications network according to claim 16 wherein the network configuration resets the processor timer upon receipt of a refresh message at the processor for the prefix-response prefix and sets the line card timer upon receipt of a prefix-response prefix at the line card for the prefix-response prefix.

18. The data communications network according to claim 17 wherein the network configuration sends prefix changes to the line card if the processor learns of a change related to a prefix it sent to the line card in response to a prefix-request.

* * * * *